(12) United States Patent
Smith (10) Patent No.: US 6,202,077 B1
(45) Date of Patent: Mar. 13, 2001

(54) SIMD DATA PROCESSING EXTENDED PRECISION ARITHMETIC OPERAND FORMAT

(75) Inventor: Roger Alan Smith, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/028,846

(22) Filed: Feb. 24, 1998

(51) Int. Cl.[7] ............... G06F 7/52; G06F 7/72; G06F 9/302
(52) U.S. Cl. ............ 708/523; 708/491; 708/518; 708/552; 708/606; 708/625
(58) Field of Search .............. 708/523, 524, 708/518, 550, 552, 603, 606, 625, 491, 501

(56) References Cited

U.S. PATENT DOCUMENTS

| | | | | |
|---|---|---|---|---|
| 5,457,804 | * | 10/1995 | Ohtomo ......................... | 708/523 |
| 5,784,305 | * | 7/1998 | Nadehara ....................... | 708/523 |
| 5,809,292 | * | 9/1998 | Wilkinson et al. ............... | 708/550 |
| 5,859,789 | * | 1/1999 | Sidwell .......................... | 708/523 |
| 5,862,067 | * | 1/1999 | Mennemeier et al. ............. | 708/501 |
| 5,880,483 | * | 3/1999 | Elliott et al. .................... | 708/501 |
| 5,880,984 | * | 3/1999 | Burchfiel et al. ................. | 708/523 |
| 5,941,941 | * | 8/1999 | Hasegawa ........................ | 708/524 |

OTHER PUBLICATIONS

Montgomery, "Modular Multiplication Without Trial Division", Mathematics of Computation, vol. 44, No. 170, pp. 519–521 (1985).

* cited by examiner

Primary Examiner—David H. Malzahn

(57) ABSTRACT

Two related extended precision operand formats provide for efficient multiply/accumulate operations in a SIMD data processing system. Each format utilizes a group of "b" bit elements in a vector register. Each of the elements provides "m" bits of precision, with b>m. The remaining b−m bits in each element accumulate overflows and carries across multiple additions and subtractions. Existing SIMD multiply-sum instructions can be used to efficiently take input operands from the first format and produce output results in the second extended precision format when $b_2 = 2b_1$ and $m_2 = 2m_1$.

23 Claims, 11 Drawing Sheets

72 — $(X_{N-1}...X_2 \ X_1 \ X_0) \times Y_0$ → PRODUCTS (0, ..., N)
74 — $(X_{N-1}...X_2 \ X_1 \ X_0) \times Y_1$ → PRODUCTS (1, ..., N+1)
⋮
76 — $(X_{N-1}...X_2 \ X_1 \ X_0) \times Y_{M-1}$ → PRODUCTS (M−1, ..., N+M−1)

*FIG. 7*

82 — $(2X_{N-1}...2X_2 \ 2X_1 \ X_0) \times X_0$ → PRODUCTS (0, ..., N)
84 — $(2X_{N-1}...2X_2 \ \ X_1) \times X_1$ → PRODUCTS (2, ..., N+1)
86 — $(2X_{N-1}...X_2) \times X_2$ → PRODUCTS (4, ..., N+2)
⋮
88 — $(X_{N-1}) \times X_{N-1}$ → PRODUCTS (2N−2, 2N−1)

SIMD DATA PROCESSING EXTENDED PRECISION ARITHMETIC OPERAND FORMAT

FIELD OF THE INVENTION

The present invention generally relates to vector processing systems, and more specifically to a set of extended precision operand formats for efficiently performing arithmetic operations in a single-instruction/multiple-data (SIMD) data processing system.

BACKGROUND OF THE INVENTION

In DSP architectures, it is common to have a multiply-accumulate instruction which can accumulate multiple products without loss of accuracy. For example, if the DSP has 16-bit input operands, the product will usually be 32-bits, and the DSP accumulator may hold 40 or 48-bits so that a number of products can be summed without having to worry about overflow or carry out of the high-order accumulator bit position.

Accumulators long enough to accumulate a number of products are much less common in general purpose computer architectures. One reason for this is that most such general purpose computer architectures utilize multiple named registers instead of the single global accumulator.

In multi-precision or extended precision multiplication operations, it is often desirable to cumulate many products without a loss of accuracy. One typical operation is to multiply two 16-bit numbers to generate a single 32-bit number. Another typical operation is to multiply two 32-bit numbers and generate two 32-bit partial products: one instruction will generate the most significant 32-bits of the full product; and another instruction will generate the least significant 32-bits of the full product. In these cases, carries and overflows are potentially problematic since each addition can potentially result in a carry or an overflow. This situation is ameliorated by an add-extended operation, in which a carry-bit can be used and set in a single addition operation.

In Single-Input/Multiple-Data (SIMD) architectures such as MMX, and VMX, things are often much more complicated. For example, the MMX and VMX architectures have multiply-sum instructions which take two registers (V1, V2) each containing eight 16-bit elements and a register (V3) containing four 32-bit elements and returns a register (V4) which contains four 32-bit elements. Let VM:N represent each 16-bit (V1/V2) or 32-bit (V3/V4) element in the four registers, with "M" representing the register number, and "N" representing the element within the register, starting from the right (0). Such a multiply-sum instruction computes:

$$V4:0 = V1:0 * V2:0 + V1:1 * V2:1 + V3:0$$
$$V4:1 = V1:2 * V2:2 + V1:3 * V2:3 + V3:1$$
$$V4:2 = V1:4 * V2:4 + V1:5 * V2:5 + V3:2$$
$$V4:3 = V1:6 * V2:6 + V1:7 * V2:7 + V3:3$$

This type of multiply/accumulate instruction can be very useful in certain applications, but there is an inherent difficulty in using the instruction if the full 16-bits of V1 and V2 are used since the sum of products V1:0*V2:0+V1:1*V2:1+V3:0 may overflow. Additionally, in multi-precision computations, a large number of products often need to be added or accumulated, and a SIMD sequence for doing this computation often requires three instructions: an add to produce a carry; an add modular for the result; and an add accumulating the carry. These three instructions cumulatively take three clock cycles on many architectures.

There are many reasons to perform multiple-precision arithmetic. One extremely important use for this type of arithmetic these days is in cryptography, such as in performing modular exponentials such as are required in RSA. In computing these modular exponentials, there is a need for many computations of the form A*B mod C, where C is fixed, and many different A and B are utilized. In common scenarios, A, B, and C are either 512-bit or 1024-bit numbers.

Figure 1:
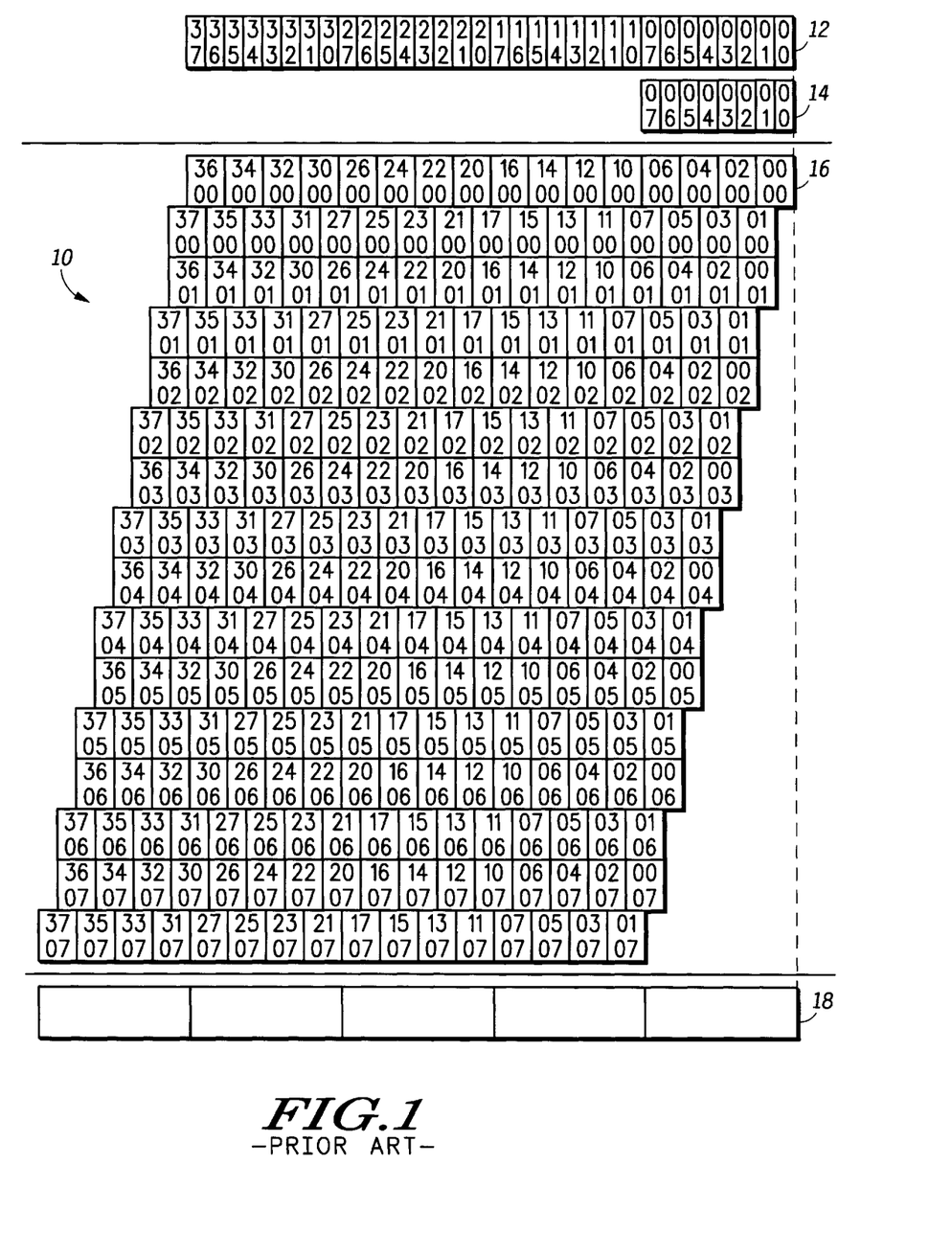
FIG. 1 is a diagram illustrating extended precision multiplication.

FIG. 1 is a diagram illustrating extended precision multiplication. An extended precision multiplier 12 consists of four 8-element groups. If each element is a 16-bit quantity, then each group is a 128-bit extended word, and the multiplier 12 is a 512-bit operand. The multiplier 12 is multiplied by one eight-element group representing a 128-bit multiplicand 14. Each element in the multiplier 12 and in the multiplicand 14 is labeled by an upper number indicating the group and a lower number representing the element within the group. The figure illustrates which elements are multiplied together to generate portions of the ultimate product 18. Sixteen sets of partial products 16 are shown with each partial product aligned according to its contribution to the entire product. Each partial product is labeled by a top row indicating the group number and element number of an element in the multiplier 12 and a bottom row indicating the group number and element number of an element in the multiplicand 14. The top, set of partial products, consists of the even numbered elements in the multiplier 12 multiplied by the first, low order element, of the multiplicand 14. Starting from the right, a least significant 32-bit partial product consists of the product of the multiplier 12 least significant element (00) multiplied by multiplicand 14 element (00). The next most significant 32-bit partial product consists of a 32-bit product of the second low order (02) multiplier 12 element multiplied by the low order multiplicand 14 element (00). This extends up through the high order multiplier 12 element (36) multiplied by the low order multiplicand 14 element (00). The next line down contains the odd-numbered elements from the multiplier 12 multiplied by the low order (00) multiplicand 14 offset by 16 bits to the left. Note should be made that this lines up with the second element in either the multiplicand 14 or the multiplier 12. The rightmost 32-bit is the 32-bit product of the (01) element of the multiplier 12 and the (00) element of the multiplicand 14. This extends up through the high order (37, 00) 32-bit product. Following this line, and equally indented, is the set of partial products formed by multiplying the even-numbered elements of the multiplier 12 by the second (01) multiplicand 14 element. This continues, with each pair of partial products being offset by 16-bits to the left over that of the previous lower order terms, until the final partial product which consists of products of the odd-numbered multiplier 12 elements multiplied by the high order (07) multiplicand 14 elements. The 16 partial products are then summed to generate the product 18. Since the multiplier 12 consists of eight 128-bit groups and the multiplicand 14 consists of one 128-bit group, the product 18 consists of five 128-bit groups. It can be seen, that the offset is provided in order to line up corresponding bits and elements for the summation.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A pair of extended precision arithmetic formats are utilized to minimize or eliminate overflow and carry problems when doing repeated multiply-accumulate computations. Each format consists of a series of coefficients ($X_N$, ..., $X_2$, $X_1$, $X_0$) of powers of $2^m$ stored in an ordered vector of "b"-bit elements, where b>m, and the numbers represented in the extended precision format are of the form:

$$V = X_N * 2^{Nm} + \ldots + X_2 * 2^{2m} + X_1 * 2^m + X_0 * 2^0$$

Figure 2:
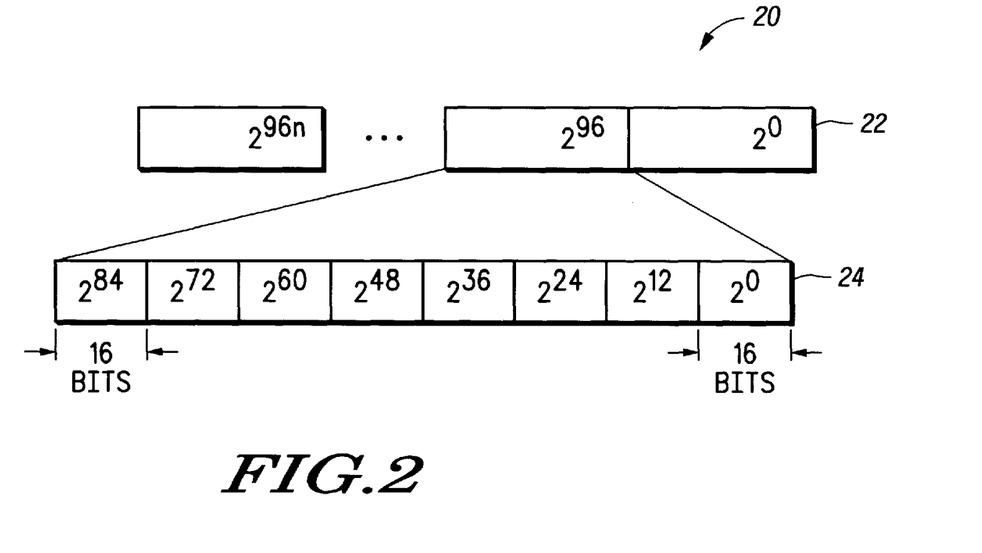
FIGS. 2 and 3 are diagrams that illustrate two extended precision formats, in accordance with the present invention.
Figure 3:
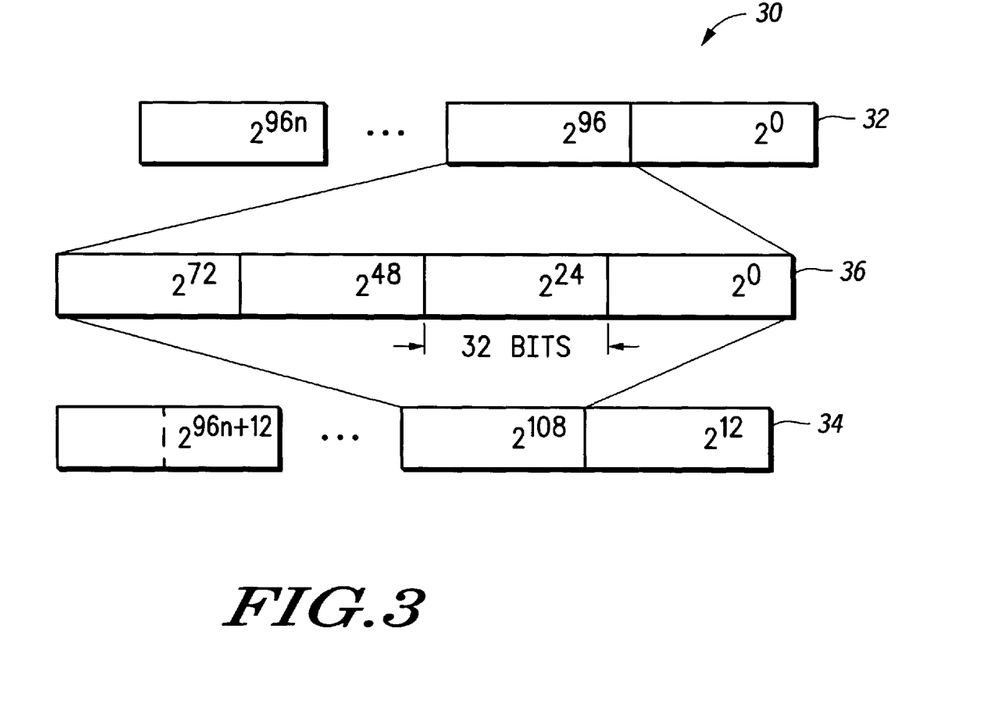

FIGS. 2 and 3 are diagrams that illustrate these two extended precision formats. FIG. 2 illustrates a first extended precision format 20. The choice of $b_1$, $m_1$ and the number of elements in a group is determined by the machine architecture. In the first extended precision format shown here, preferably $b_1=16$ and $m_1=12$ for a machine architecture which can do in parallel four sets of two 16-bit by 16-bit multiplications accumulating to a 32-bit product.

An extended precision number 22 is represented as a sequence of 128-bit groups ($G_p$, ..., $G_1$, $G_0$). Each 128-bit group $G_i$ is comprised of eight 16-bit elements 24 ($X_7$, ..., $X_2$, $X_1$, $X_0$). In each of the 16-bit elements 24, the twelve or thirteen least significant bits are used to hold the numbers $X_i$ and the four or three most significant bits are zero for unsigned numbers. Preferably, a number which is converted from an external packed format to the first extended precision format will have 12 significant bits and four zero bits, while a number which is converted from the second extended precision format will have 13 significant bits and three zero bits. The number represented by the 128-bit group $G_i$ is computed by:

$$G_i = (X_7 * 2^{84} + X_6 * 2^{72} + \ldots + X_2 * 2^{24} + X_1 * 2^{12} + X_0 * 2^0)$$

Note, that any carry or overflow bits in the top four bits of a 16-bit element are implicitly carried into the next higher order element by this computation. Just as the 16-bit elements are coefficients of $2^0$, $2^{12}$, $2^{24}$, ..., $2^{84}$, the 128-bit groups are coefficients of $2^0$, $2^{96}$, $2^{192}$, and the value of an extended precision operand is:

$$V = G_p * 2^{96p} + \ldots + G_2 * 2^{192} + G_1 * 2^{96} + G_0 * 2^0$$

Six 128-bit groups can be used to represent 512 bit numbers, and eleven 512-bit groups can be used to represent 1,024 bit numbers as required by the more popular versions of secure encryption such as RSA. While a given value may be represented by many different sets of group values, a set of group values represents just one number.

FIG. 3 illustrates a second extended precision format 30. In the second extended precision format 30 shown here, $b_2=2*b_1=32$ and $m_2=2*m_1=24$. As with FIG. 2, the high level operand 32 is represented as 128-bit groups, each offset from the previous one by $2^{96}$. However, each 128-bit group is broken into an ordered sequence of four 32-bit elements ($Y_3$, $Y_2$, $Y_1$, $Y_0$), with each 32-bit element representing 24 bits of precision, with the remaining 8 bits retained for accumulating carries. Thus, a group $G_i$ can be constructed from the four low order elements 36, by multiplying the low order 32-bit element by $2^0$, the second low order 32-bits by $2^{24}$, the third low order 32-bits by $2^{48}$, and the high order 32 bits by $2^{72}$:

$$G_x = Y_3 * 2^{72} + Y_2 * 2^{48} + Y_1 * 2^{24} + Y_0 * 2^0$$

A multiply-accumulate result represented in the second extended precision format is represented by two sets of groups, an even set with groups $E_i$ 32 and an odd set with elements $O_i$ 34. The value represented by a pair of even and odd sets is $$V = E_p * 2^{96p} + \ldots + E_2 * 2^{192} + E_1 * 2^{96} + E_0 * 2^0 + (O_p * 2^{96p} + \ldots + O_2 * 2^{192} + O_1 * 2^{96} + O_0 * 2^0)2^{12}.$$

A product of two 12-bit numbers gives a 24-bit product, a product of a 12-bit number with a 13-bit number gives a 25-bit product, and a product of two 13-bit numbers gives a 26-bit product. Since 32 bits are available in each element of the multiply-accumulate result in the second extended precision format, this means that 256 24-bit products, 128 25-bit products, or 64 26-bit products may be accumulated into each element before overflow can occur. As a result, carry operations are infrequently needed. Further, when it is necessary to perform carries (e.g., after 256 24-bit products have been accumulated), it is only necessary to remove the high-order 8 bits from each element in the either the even or odd component of the multiply-accumulate result and add it into the next highest element in the same component. These operations may be performed in parallel. After the addition, each element of the multiply-accumulate result acts as if most 1 carry has occurred. It is not necessary to "ripple" the carries through all groups representing the value.

In contrast to FIGS. 2–3, the normal packed format has $b_1=m_1$ and $b_2=m_2$, and unless a carry operation is performed along with each accumulate, undetected overflow can occur. In the present invention the second extended precision format permits many accumulations before a carry operation needs to be done, and the first extended precision format enables general-purpose processor instructions to produce and accumulate products in the second extended precision format.

Figure 4:
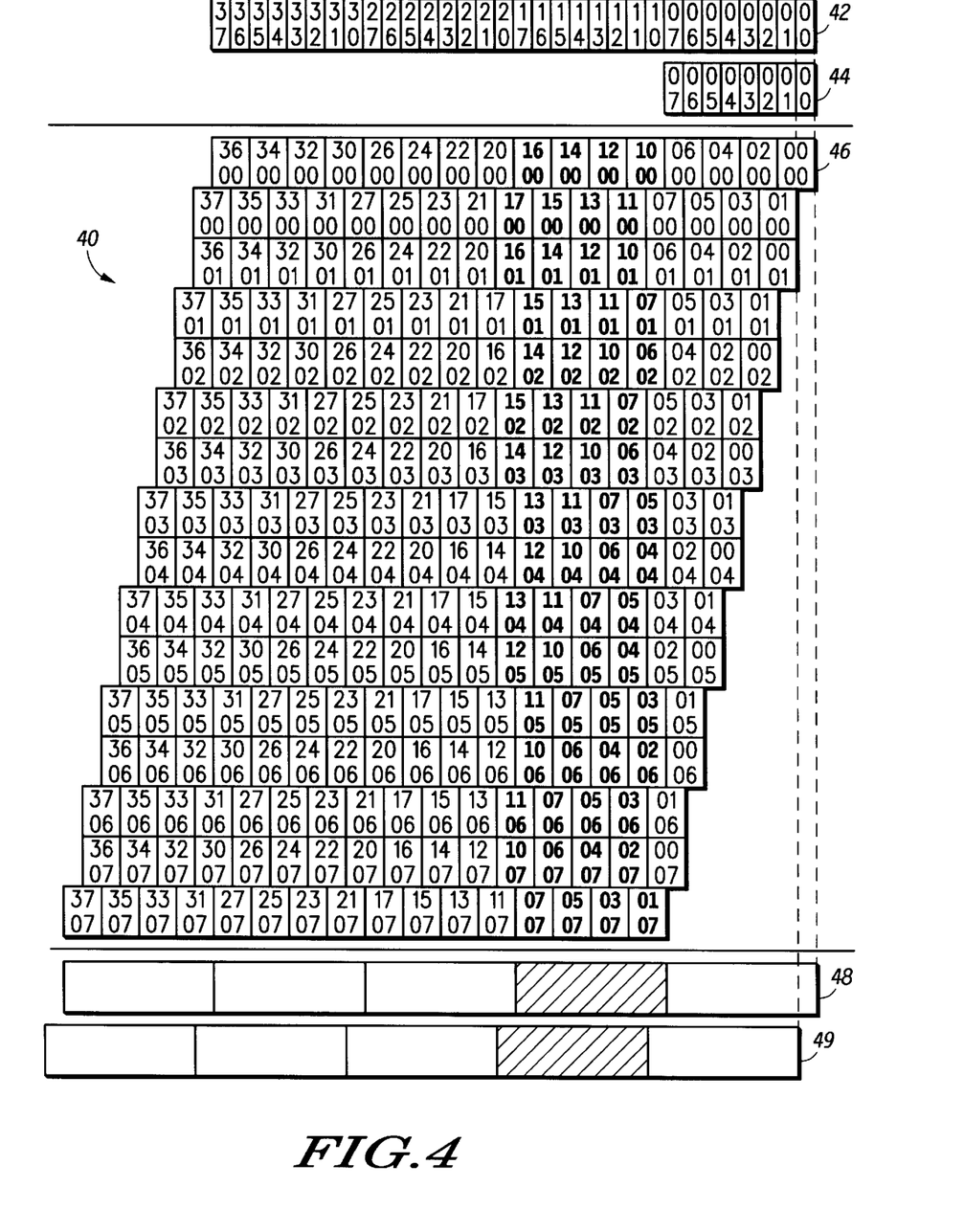
FIG. 4 is a block diagram illustrating multiplication using the two extended precision formats shown in FIGS. 2 and 3.

FIG. 4 is a block diagram illustrating multiplication of a multiple-group multiplier by a single-group multiplicand using the two extended precision formats shown in FIGS. 2 and 3. It appears similar to FIG. 1, except here the multiplier 42 and multiplicand 44 are in the first operand format 20, and the partial products 46 and even 48 and odd accumulated product are stored in the second precision format 30. Thus, each element in the multiplier 42 and multiplicand 44 is a 16-bit element containing 12 or 13 ultimate bits of precision. Each of the partial product elements consist of 32 bits, with 24 bits being used for products and 8 bits for carries into the next element. In FIG. 4, the elements multiplied in the partial products 46 that are added together to generate the second-lowest-order words in the even 48 and odd 49 products are highlighted in bold. The corresponding second low order words in the even 48 and odd 49 sets of the product are identified by cross-hatching. It can thus be seen that those partial products 46 offset by an even number of 16-bit elements are accumulated together into an even product 48 and the partial product 46 elements offset by an odd number of 16-bit elements are accumulated together in the odd product 49. It should be noted here, that it is possible to accumulate up to $2^8$ or 256 partial products in the even 48 or odd 49 product operands.

Note that while FIG. 4 looks very much like FIG. 1, the meaning associated with the boxes has changed. In FIG. 1, each group represented a 128-bit number, while in FIG. 4, each group represents roughly 96 bits of a number. Further, the multiplication depicted in FIG. 1 shows accumulations to a single set of groups which would require carries to be performed explicitly after each multiply, while in FIG. 4 accumulations are to a pair of even and odd groups and many multiplies can be accumulated before carries need to be performed.

Figure 5:
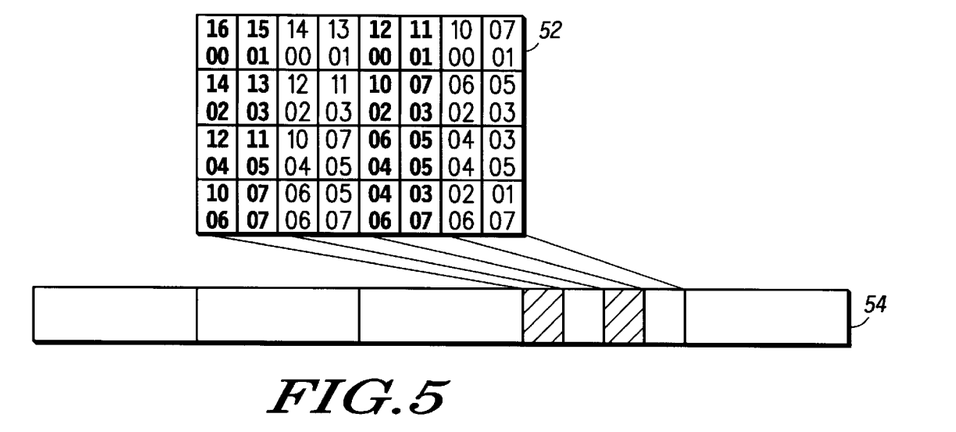
FIG. 5 is a block diagram showing an arrangement of partial products which contribute to four fields of an accumulator for even powers of a product, in accordance with the present invention.

FIG. 5 illustrates a useful grouping of partial products which are summed into the even set of groups of the multiply-accumulate result. The array 52 is a rearrangement of those bold-faced terms in FIG. 4 which accumulate into the second-lowest-order group in the even set of groups. The partial-product terms are divided into four rows, each consisting of four pairs of columns. Each pair of column contains all contributions to the corresponding element of this group. For example, the first two columns contain the products of terms (16,00), (15,01), (14,02), (13,03), (12,04), (11,05), (10,06), (07,07), which are all of the terms in FIG. 4 which contribute to the high-order 32 bits of the second-lowest-order group in the even set of groups. The arrangement in FIG. 5 is particularly efficient, because one multiply-sum instruction can perform the eight multiplications and the eight additions needed to add the entire contribution from one row of the array 52. Furthermore, the multiplier operand for each multiply sum instruction is easily obtained by shifting a pair of registers containing the data from two groups of the multiplier in the first extended precision format and the same four multiplicand operands for the multiply sum instruction can be used for all groups of the multiplier.

Figure 6:
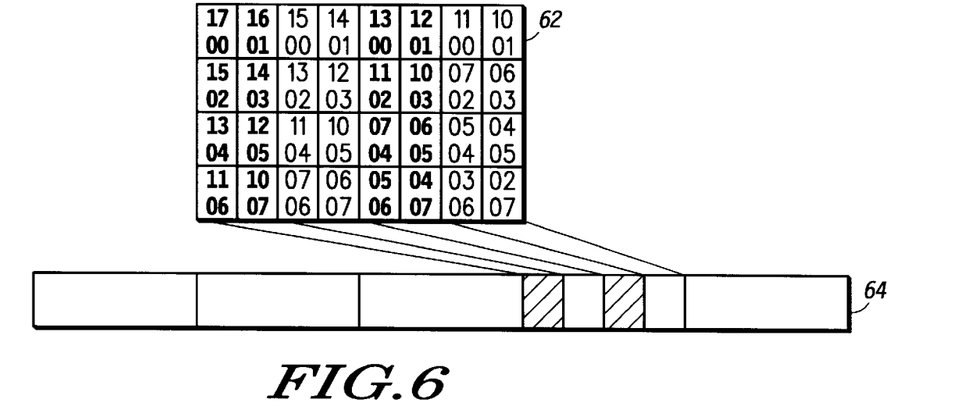
FIG. 6 is a block diagram showing an arrangement of partial products which contribute to four fields of an accumulator for odd powers of a product, in accordance with the present invention.

FIG. 6 illustrates a useful grouping of partial products which are summed into the odd set of groups of the multiply-accumulate result. The array 52 is a rearrangement of those bold-faced terms in FIG. 4 which accumulate into the second-lowest-order group in the odd set of groups. The partial-product terms are divided into four rows, each consisting of four pairs of columns. Each pair of column contains all contributions to the corresponding element of this group. For example, the first two columns contain the products of terms (17,00), (16,01), (15,02), (14,03), (13,04), (12,05), (11,06), (10,07), which are all of the terms in FIG. 4 which contribute to the high-order 32 bits of the second-lowest-order group in the odd set of groups. The arrangement in FIG. 6 is particularly efficient, because one multiply-sum instruction can perform the eight multiplications and the eight additions needed to add the entire contribution from one row of the array 52. Furthermore, the multiplier operand for each multiply sum instruction is easily obtained by shifting a pair of registers containing the data from two groups of the multiplier in the first extended precision format and the same four multiplicand operands for the multiply sum instruction can be used for all groups of the multiplier for both the even and odd groups of the multiply-accumulate result.

To be explicit about how both even and odd group elements $E_i$ and $O_i$ may be computed, suppose that register $r_i$ has the values $(V_7 \ldots V_0)$ of group i of the multiplier and register $r_{i-1}$ has the values $(V_7 \ldots V_0)$ of group i−1 of the multiplier (a value of 0 if i is 0), and that register so has the values $(V_0V_1\ V_0V_1\ V_0V_1\ V_0V_1)$, register $s_1$ has the values $(V_2V_3\ V_2V_3\ V_2V_3\ V_2V_3)$, register $s_2$ has the values $(V_4V_5\ V_4V_5\ V_4V_5\ V_4V_5)$ and register $s_3$ has the values $(V_6V_7\ V_6V_7\ V_6V_7\ V_6V_7)$ of the multiplicand, and that registers $E_i$ and $O_i$ have previously accumulated results for the even and odd parts of group "i" of the multiply-accumulate operation. Then the operations row0=sld($r_i$, $r_{i-1}$, 2)
row1=sld($r_i$, $r_{i-1}$, 6)
row2=sld($r_i$, $r_{i-1}$, 10)
row3=sld($r_i$, $r_{i-1}$, 14)
row5=sld($r_i$, $r_{i-1}$, 4)
row6=sld($r_i$, $r_{i-1}$, 8)
row7=sld($r_i$, $r_{i-1}$, 12)
$E_i$=msum(row0, $s_0$, $E_i$)
$E_i$=msum(row1, $s_1$, $E_i$)
$E_i$=msum(row2, $s_2$, $E_i$)
$E_i$=msum(row3, $s_3$, $E_i$)
$O_i$=msum($r_i$, $s_0$, $O_i$)
$O_i$=msum(row5, $s_1$, $O_i$)
$O_i$=msum(row6, $s_2$, $O_i$)
$O_i$=msum(row7, $s_3$, $O_i$)

perform all of the accumulations into $E_i$ and $O_i$. On a superscalar machine, these instructions can be scheduled so that a shift (sld) and a multiply-sum instruction (msum) can be issued at the same clock cycle.

Figure 7:
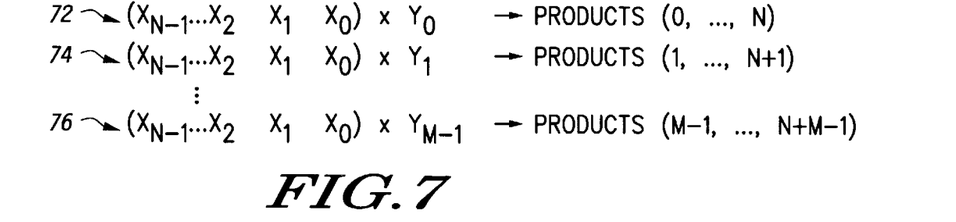
FIG. 7 is a set of equations that illustrate the accumulation of products for multiplying an N-group multiplier by an M-group multiplicand, in accordance with the present invention.

FIG. 7 illustrates how the technique described by the accumulation of products illustrated in FIGS. 4–6 are extended to multiplicands represented by more than one group. FIG. 7 illustrates a product of an N-group multiplier 42 represented in the first extended precision format 20 $(X_{N-1} \ldots, X_2, X_1, X_0)$ multiplied by an M-group multiplicand 14, again represented in the first extended precision format 20, represented by $(Y_{M-1} \ldots, Y_1, Y_0)$. The first line in the equations 72 shows: $(X_{N-1} \ldots, X_2, X_1, X_0) \times$ $Y_0 \rightarrow$ PRODUCTS (0, . . . N). This indicates multiplying the multiplier 12 by the low order ($Y_0$) multiplicand 14 elements and accumulating their products into the second extended precision format multiply-accumulator groups $E_N$ to $E_0$ and $O_N$ to $O_0$, as previously illustrated in FIGS. 5–6. It should be noted here that even offset products are accumulated together in the even product 48, and the odd offset products are accumulated together in the odd product 49. The second line 74 shows: $(X_{N-1} \ldots ,X_2,X_1,X_0) \times Y_1 \rightarrow$ PRODUCTS (1, . . . N+1). This illustrate multiplying each element in the multiplier 42 by the second low order element ($Y_1$) in the multiplicand 44. The product from group i of the multiplier with group 1 of the multiplicand is now accumulated into product groups $E_{i+1}$ and $O_{i+1}$ instead of $E_i$ and $O_i$ as in line 72. In general, as shown in the remainder of FIG. 7, the product from group i of the multiplier with group j of the multiplicand is now accumulated into product groups $E_{i+j}$ and $O_{i+j}$. This continues, until the last line 76 which contains $(X_{N-1} \ldots ,X_2,X_1,X_0) \times Y_{M-1} \rightarrow$ PRODUCTS (M−1, N+M−1) in which the product from group i of the multiplier with group M−1 of the multiplicand is now accumulated into product groups $E_{i+M-1}$ and $O_{i+M-1}$. Note that the use of the first and second extended precision formats allows products to be accumulated without explicit carries until the number of accumulations reaches one of the limits described previously.

Figure 8:
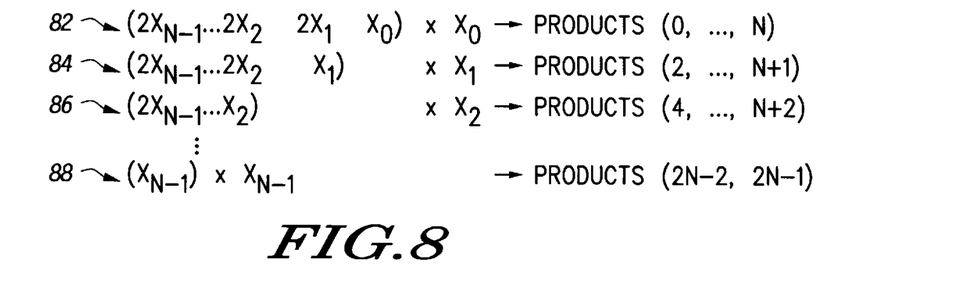
FIG. 8 is a set of equations that illustrate the accumulation of products for squaring an N-group number, in accordance with the present invention.

FIG. 8 illustrates performing a square function on a single operand $(X_{N-1} \ldots ,X_2,X_1,X_0)$. In a squaring operation, all but the diagonal product terms are generated twice, so significant savings are achieved by computing off-diagonal product terms with a factor of 2 and diagonal product terms with a factor of 1. Thus, the first line 82 illustrates $(2X_{N-1} \ldots , 2X_2, 2X_1, X_0) \times X_0 \rightarrow$ PRODUCTS (0, . . . N). This illustrates the products generated by taking the $X_0$ multiplicand element. The $(2X_{N-1} \ldots , 2X_2, 2X_1)$ terms can be precomputed by left shifting the operand by 1 bit. In the first extended precision format, this shifting can be done without loss of bits out of the high end of any element in any group, whereas this would not be possible in the normal fully packed result format. In the second line 84, the quantity $(2X_{N-1} \ldots , 2X_2, X_1) \times X_1 \rightarrow$ PRODUCTS (2, . . . ,N+1) illustrates the products generated by taking $X_1$ multiplicand element. Note that the $X_0$ term is not included here, since it was already generated by the factor of 2 associated with the $X_1$ element in line 82. In the third line 86, the quantity $(2X_{N-1} \ldots ,X_2)$ is multiplied by $X_2$ to give the PRODUCTS (4, . . . ,N+2). This repeated until the final term shown on the last line 88 of FIG. 8 which has the $X_{N-1}$ term multiplied times the $X_{N-1}$ going into the even and odd product groups 2N−2 and 2N−1.

Figure 9:
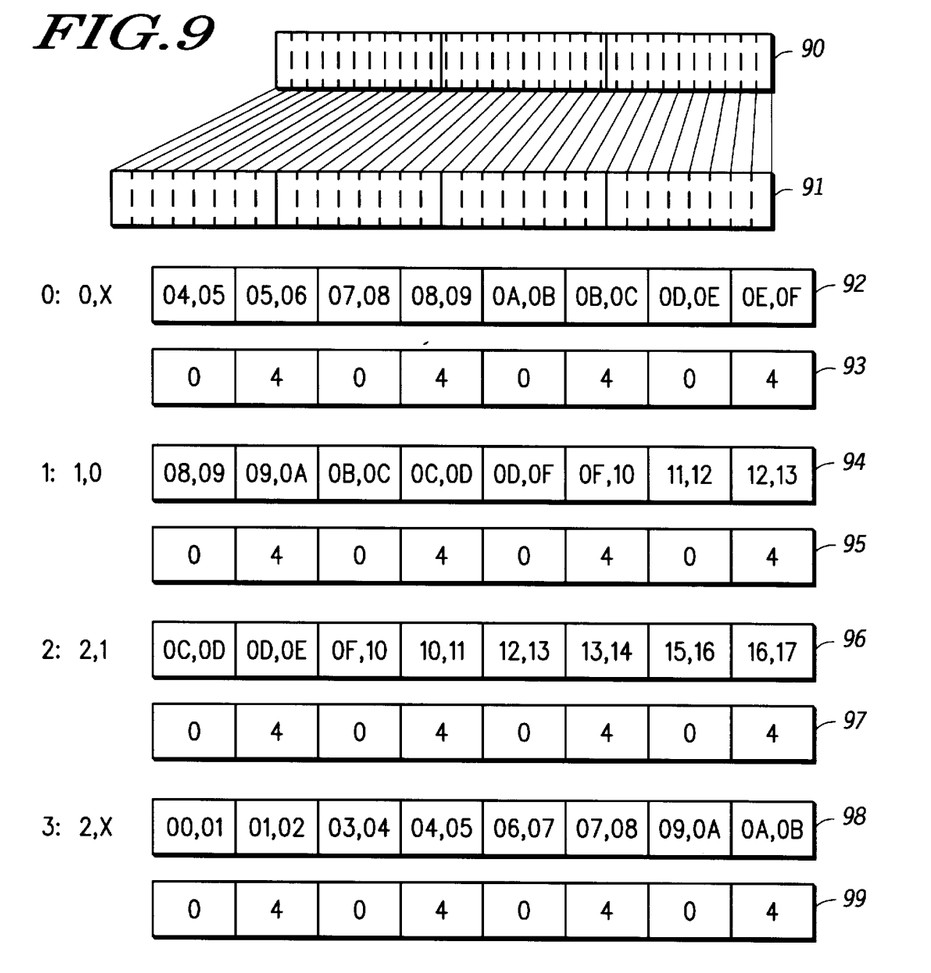
FIG. 9 is a block diagram illustrating conversion from a packed external format to a first extended precision format, in accordance with the present invention.

FIG. 9 illustrates conversion from an external packed multiprecision format to the first extended precision format. Let M be the number of 128-bit packed sequences to be converted. Let Q be the integer part of M/3 and R=M−3 Q. Boxes 90 illustrate the 3 128-bit input words and boxes 91 illustrate the 4 128-bit output words. In general, 12-bit sequences from the boxes 90 are zero-extended into 16-bit sequences in the boxes 91. A specific way of performing these operations in a Single Instruction Multiple Data (SIMD) processor is shown. Let registers r0,r1,r2 contain, respectively, groups 3n, 3n+1 and 3n+2 of the group of 128-bit words corresponding to the packed extended precision number. The values in these registers are represented by boxes 90. Boxes 91 represent the four 128-bit extended precision words after the conversion. Box 92 shows a sequence of 8-bit indices into the 16 8-bit components of register 0. A permnutation defined by these indices in a register p1 is applied to register 0, placing in a result register t the bytes of register 0 indexed by those indices. Then each of the 8 16-byte components of t is shifted left by the number of bits in a preloaded register s containing the values shown in box 93. Finally, each 16-bit value is shifted left by 4 bits into a register R0, where 8 copies of 4 are preloaded into a register f. After this operation, register R0 contains group 4n of the converted value. Code describing this is:

$t$=perm(r0,r0,p1)

$q$=sl($t$, $s$)

R0=sl($q$, $f$).

Similarly, boxes 94 show the indices in a register p2 into an array of the 32 bytes obtained by concatenating r1 and r0, and boxes 95 show shift amounts in a register s. Code resulting in group 4n+1 of the converted result in R1 is:

$t$=perm(r1,r0,p2)

$q$=sl($t$, $s$)

R1=sl($q$, $f$).

Similarly, boxes 96 show the indices in a register p3 into an array of the 32 bytes obtained by concatenating r2 and r1, and boxes 97 show shift amounts in a register s. Code resulting in group 4n+2 of the converted result in R2 is:

$t$=perm(r2,r1,p3)

$q$=sl($t$, $s$)

R2=sl($q$, $f$).

Similarly, boxes 98 show the indices in a register p4 into an array of the 16 bytes of r2, and boxes 99 show shift amounts in a register s. Code resulting in group 4n+3 of the converted result in R3 is:

$t$=perm(r2,r2,p3)

$q$=sl($t$, $s$)

R3=sl($q$, $f$).

This method is applied Q times to expand 3Q 128-bit input words to 4Q words. If R is zero, the work is complete. If R is 1, 1 128-bit word of binary zeroes is prepended to the highest-order word, and output words R0 and R1 are computed as above. If R is 2, 2 128-bit words of zero are prepended to the highest-order word, and output words R0, R1 and R2 are computed as above. These methods may be performed in a loop if M is not known in advance, or the loop may be unrolled if M is known in advance.

Figure 10:
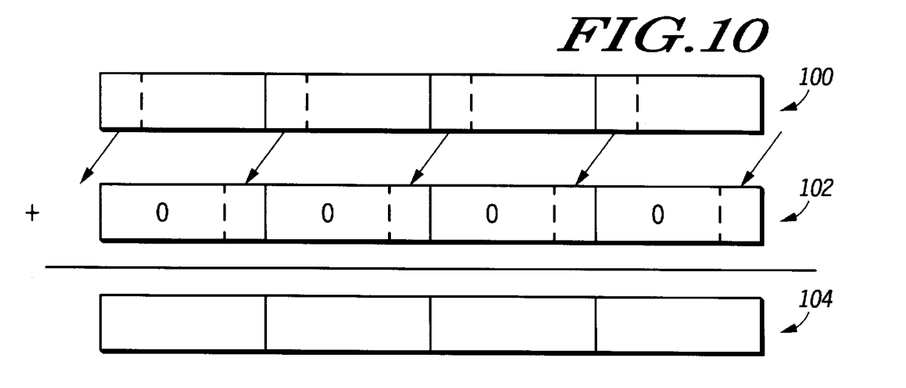
FIG. 10 is a block diagram illustrating carrying within the second extended precision format.

FIG. 10 illustrates how carries may be performed when the number of accumulations reaches 64 (13-bit by 13-bit components), 128 (13-bit by 12-bit or 12-bit by 13-bit components) or 256 (12-bit by 12-bit components). Boxes 100 illustrate four 32-bit values of a $E_i$. Boxes 102 illustrate four 32-bit values obtained by zero-extending the high-order 8 bits of each of the three low-order elements of the group and the high-order 8 bits of the high-order element of the group $E_{i-1}$. These two values are added to obtain a carried group 104 $E_i$. While internal carries in the addition may lead to 25-bit values, there is space for these in the 32-bit format and additional ripple carries are not needed; it is sufficient to take the result as already having had one carry into each element.

Figure 11:
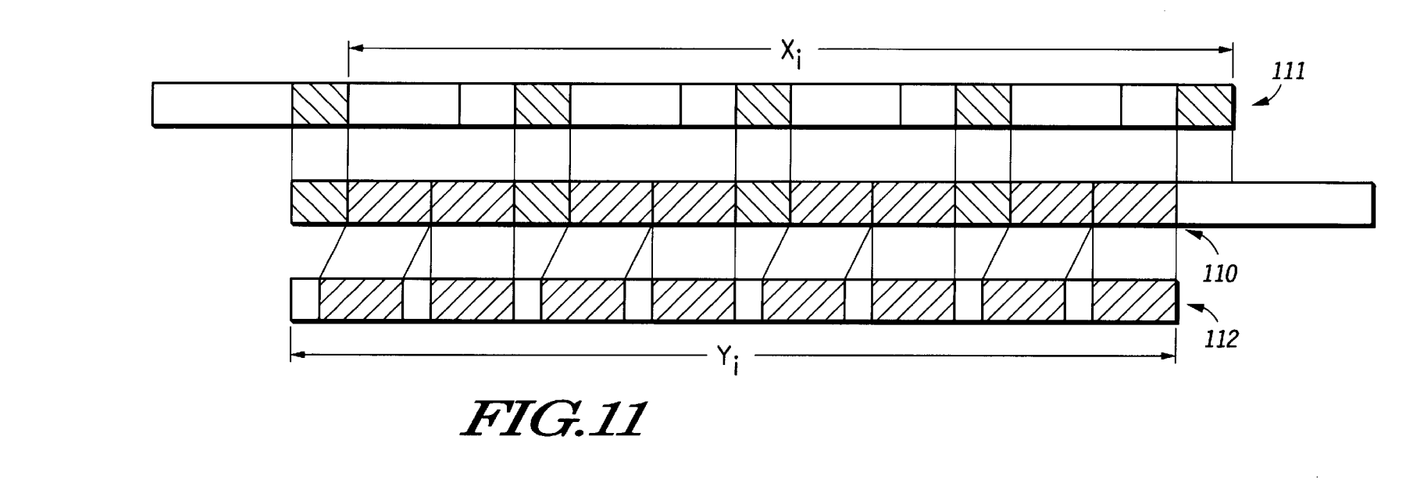
FIGS. 11–13 are block diagrams illustrating conversion from the second extended precision format to the first extended precision format, in accordance with the present invention.
Figure 12:
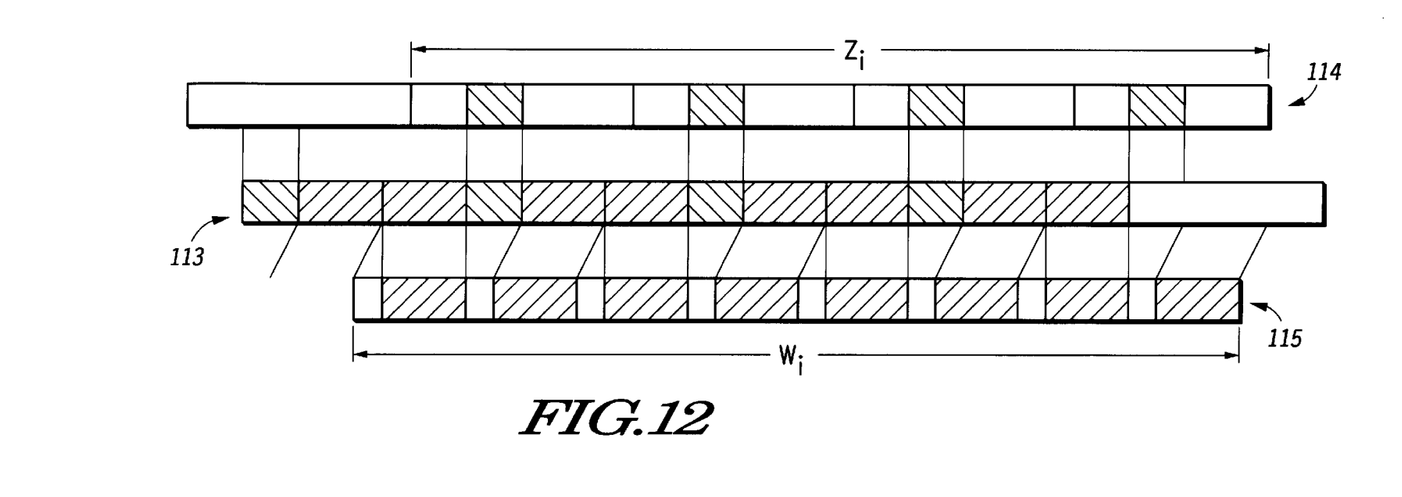
Figure 13:
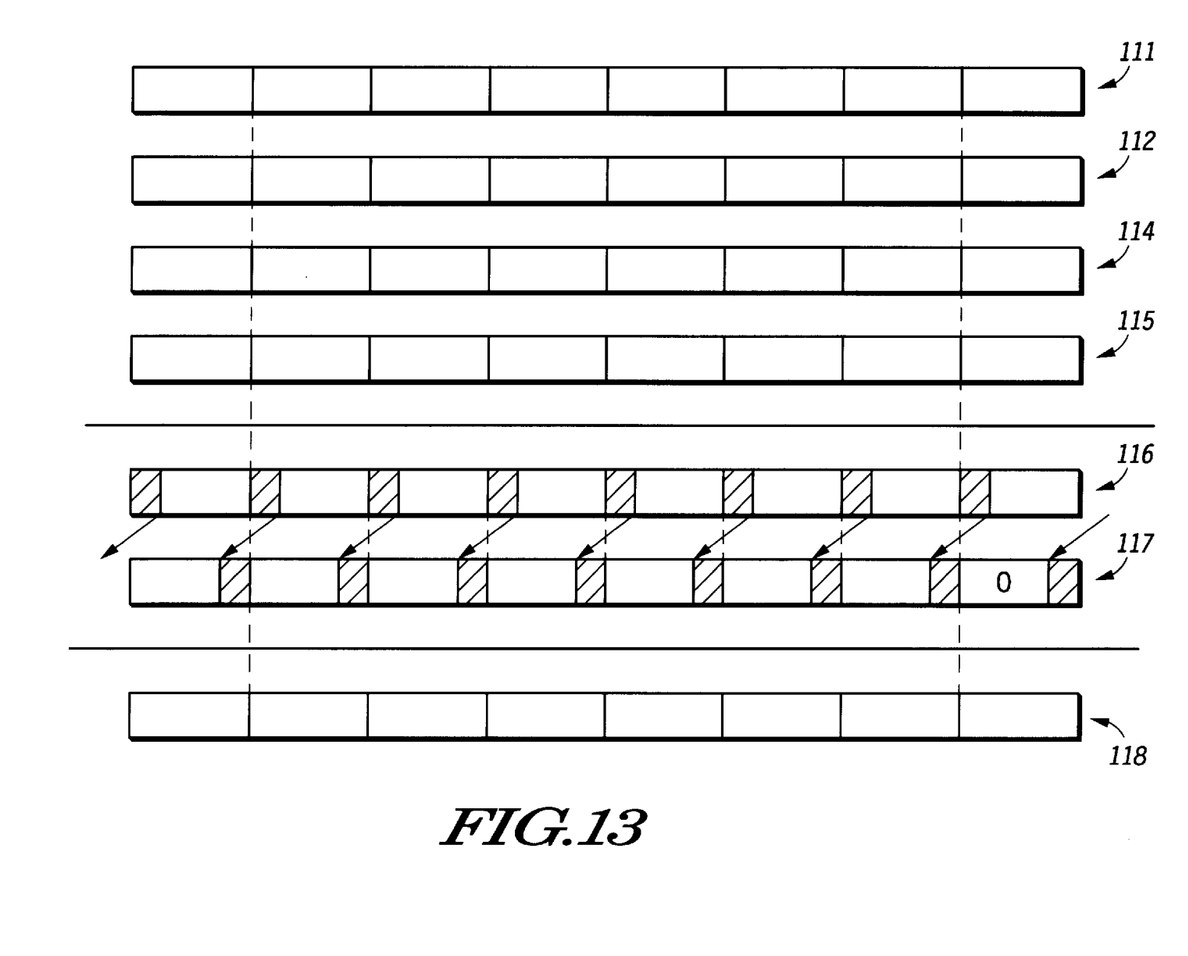

FIGS. 11–13 illustrates a means for converting a number in the second extended precision format to the first extended precision format. Essentially the bits from each pair of $E_i$ and $O_i$ are combined, with some carry from the $E_{i-1}$ and $O_{i-1}$ and some carry into $E_{i+1}$ and $O_{i+1}$. FIG. 11 shows the construction of two 128-bit words $X_i$ and $Y_i$ from $E_i$ and a few bits from $E_{i-1}$. $E_i$ is represented by the bit fields represented by box 110 between the two arrows. The high-order part of $E_{i-1}$ is represented by the part of box 110 to the right of the right arrow. The word $X_i$ represented by box 111 is constructed from the 4 highest 8 bits from element 3 of $E_{i-1}$ and from elements 0, 1 and 2 of $E_i$. The remaining bits of $X_i$ are set to 0. The word $Y_i$ represented by box 112 is constructed from the lowest 24 bits from each element of $E_i$ as shown, with each 24-bit part being split into two 12-bit parts separated by 4 bits of zero. FIG. 12 shows the construction of two 128-bit words $Z_i$ and $W_i$ from $O_i$ and $O_{i-1}$. $O_i$ is represented by the part of box 113 between the two arrows, and the high-order part of $O_{i-1}$ is represented by the part of box 113 to the right of the right arrow. The word $Z_i$ represented by box 114 is constructed from the 4 highest 8 bits from element 3 of $O_{i-1}$ and from elements 0, 1 and 2 of $O_i$. The remaining bits of $Z_i$ are set to zero. The word $W_i$ represented by box 115 is constructed from 12-bit fields from element 3 of $O_{i-1}$ and from elements 0, 1, 2 and 3 of $O_i$ as shown. FIG. 13 shows the additions of the words $X_i$ 111, $Y_i$ 112, $Z_i$ 114 and $W_i$ 115 to form a set of 8 16-bit sums 116. In performing this sum, no overflow can occur in any of the 8 terms, but the number of bits in any 16-bit field may exceed 13. The next step is to reduce the number of bits to 13 by forming a 128-bit word 117 from the four highest bits of each 16-bit field of word 116 and the four highest bits of element 7 of the previous word 116. The other bits of word 117 are set to 0, and the bits which were copied from word 116 are zeroed from word 116. Finally, words 116 and 117 are added to form word 118 which is group $G_i$ in the first extended precision format. This process is repeated for all groups of the second extended precision format number. The repetition may be carried out via a loop if the number of groups is variable, or the loop may be unrolled if the number of groups is known.

Figure 14:
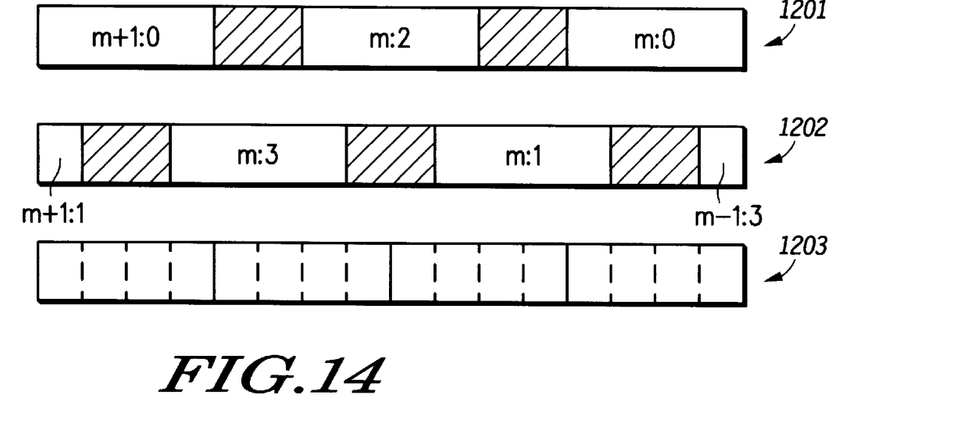
FIGS. 14–20 are block diagrams illustrating conversion from the second extended precision format to a packed multiprecision format, in accordance with the present invention.
Figure 15:
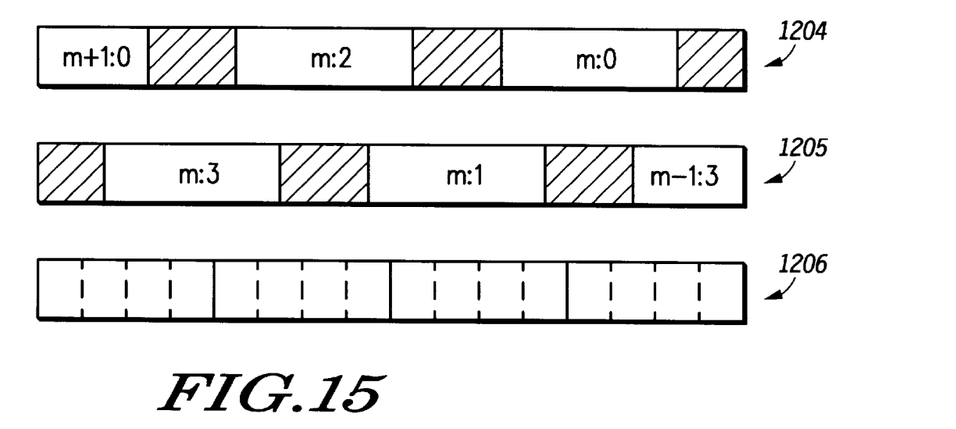
Figure 16:
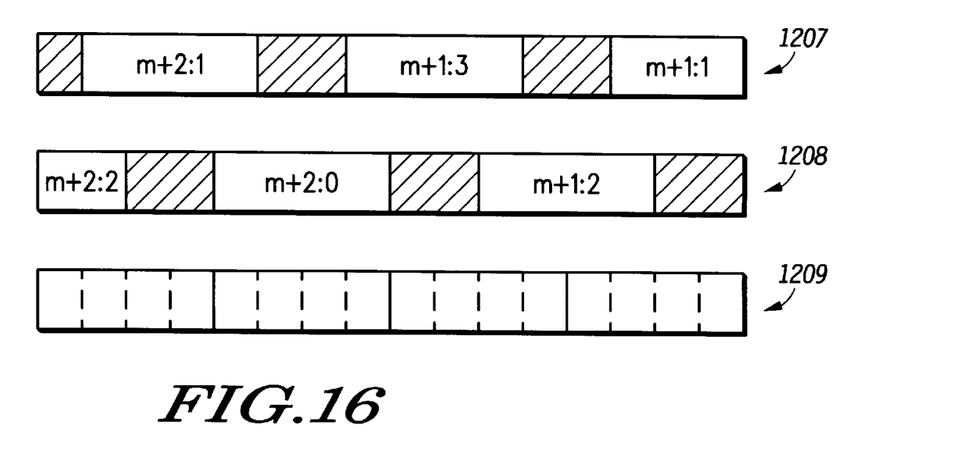
Figure 17:
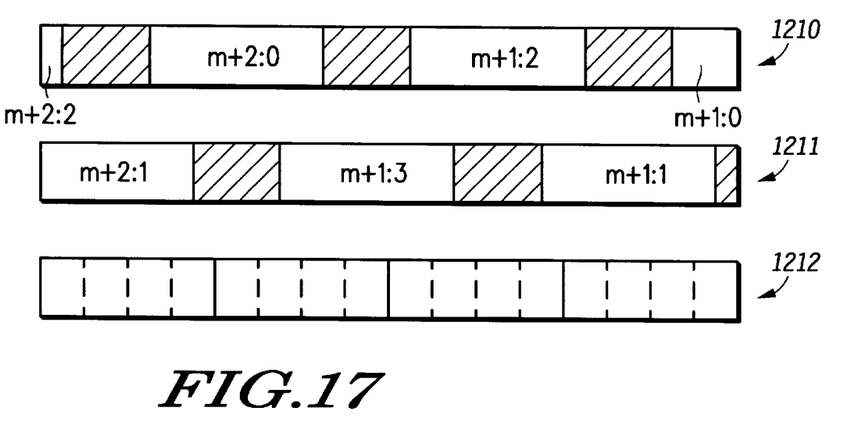
Figure 18:
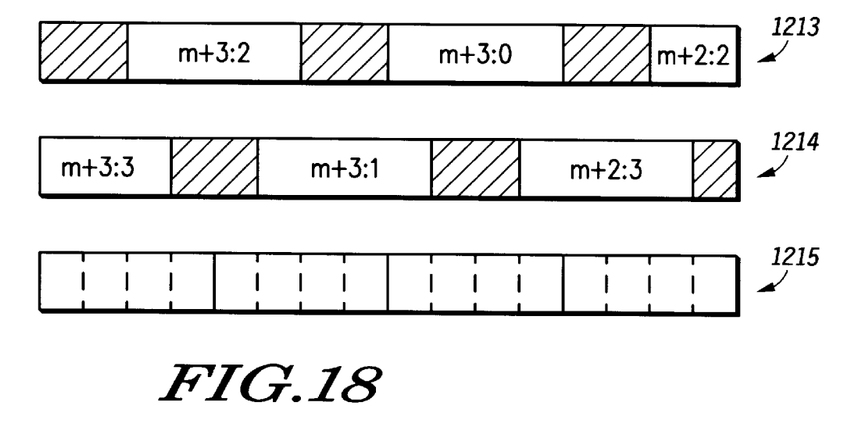
Figure 19:
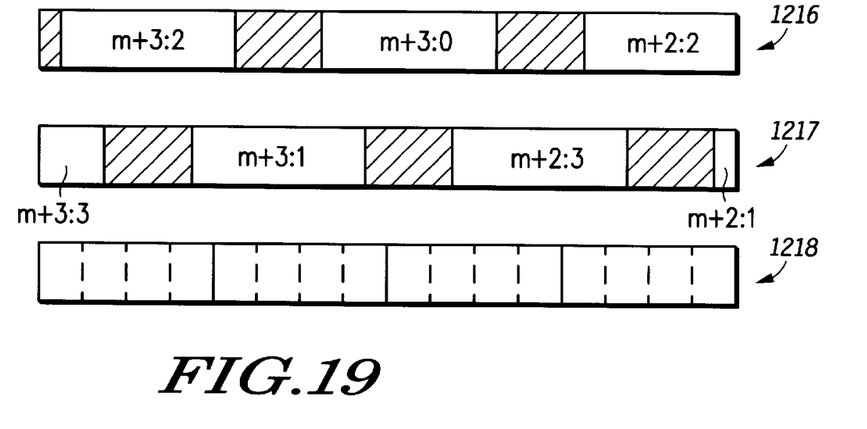
Figure 20:
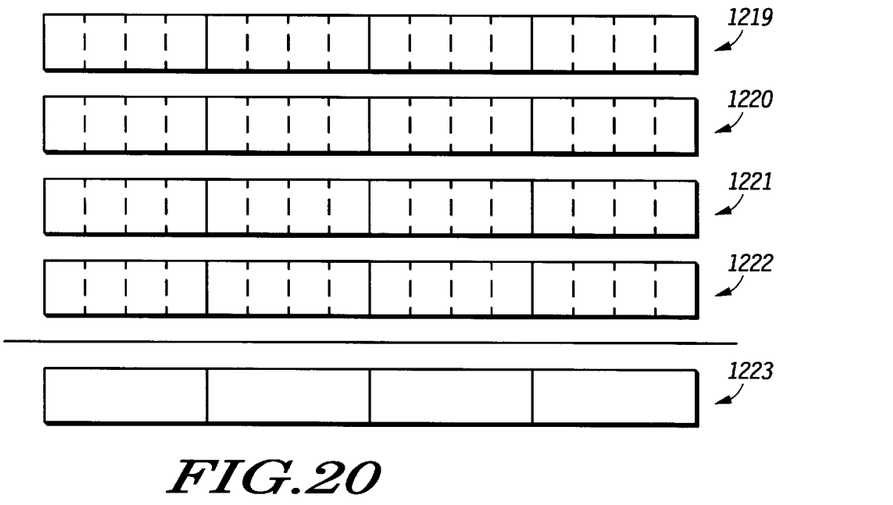

FIGS. 14–20 illustrate the conversion of a number represented in the second extended precision format to a packed multiprecision number. The conversion is done with blocks of four input groups being converted to three 128-bit numbers in packed format. Let m denote a multiple of 4. Then FIG. 12 illustrates the method for converting the groups $E_m$, $E_{m+1}$, $E_{m+2}$, $E_{m+3}$, $O_m$, $O_{m+1}$, $O_{m+2}$, and $O_{m+3}$ into three output 128-bit words. FIG. 14 illustrates the construction of two 128-bit words 1201 and 1202 from $E_m$ and $E_{m+1}$, with the 128-bit word 1203 showing the alignment of 16 8-bit words. In FIG. 14, the notation n:j indicates element j of group $E_n$. FIG. 15 illustrates the construction of two 128-bit words 1204 and 1205 from $O_{m-1}$, $O_m$ and $O_{m+1}$, with the 128-bit word 1206 showing the alignment of 16 8-bit words. In FIG. 15, the notation n:j indicates element j of group $O_n$. The words 1201, 1202, 1204 and 1205 are contributions to the low-order 128-bit word of the three 128-bit words being generated. FIG. 16 illustrates the construction of two 128-bit words 1207 and 1208 from $E_{m+1}$ and $E_{m+2}$, with the 128-bit word 1209 showing the alignment of 16 8-bit words. In FIG. 16, the notation n:j indicates element j of group $E_n$. FIG. 17 illustrates the construction of two 128-bit words 1210 and 1211 from $O_{m+1}$ and $O_{m+2}$, with the 128-bit word 1212 showing the alignment of 16 8-bit words. In FIG. 17, the notation n:j indicates element j of group $O_n$. The words 1207, 1208, 1210 and 1211 are contributions to the middle-order 128-bit word of the three 128-bit words being generated. FIG. 18 illustrates the construction of two 128-bit words 1213 and 1214 from $E_{m+2}$ and $E_{m+3}$, with the 128-bit word 1215 showing the alignment of 16 8-bit words. In FIG. 18, the notation n:j indicates element j of group $E_n$. FIG. 19 illustrates the construction of two 128-bit words 1216 and 1217 from $O_{m+2}$ and $O_{m+3}$, with the 128-bit word 1218 showing the alignment of 16 8-bit words. In FIG. 19, the notation n:j indicates element j of group $O_n$. The words 1213, 1214, 1216 and 1217 are contributions to the low-order 128-bit word of the three 128-bit words being generated. FIG. 20 illustrates the addition of four words 1219, 1220, 1221 and 1222 to achieve a sum 1223. The words 1219, 1220, 1221 and 1222 can represent any of the three sets of four words developed in FIGS. 14–19. The desired addition is 128-bit addition, with carry from the previous addition of four numbers and carry to the next addition of four numbers. If only four 32-bit wide parallel additions are available, it is necessary to ripple the 32-bit carries throughout the sum. This is time consuming, but in performing a 1024×1024 bit multiply, this is already a small part of the total cost, and in practical cryptographic applications, this needs to be performed only once after many operations have been carried out in the first and second extended precision formats.

Figure 21:
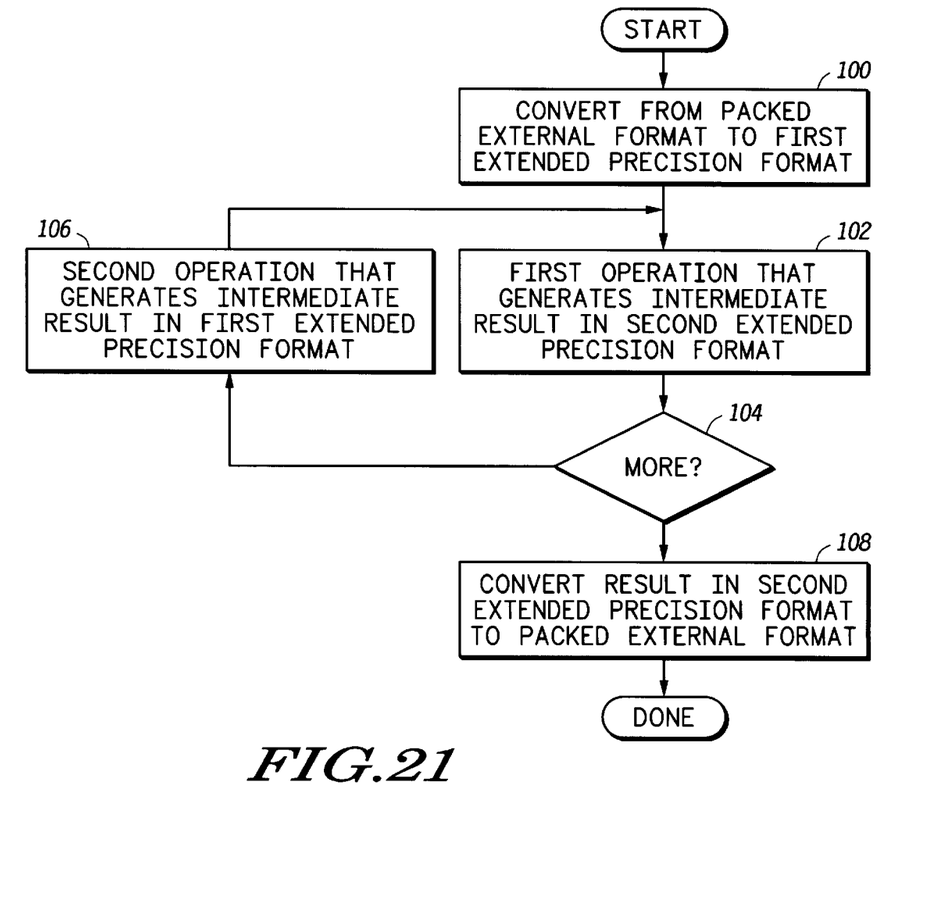
FIG. 21 is a flowchart illustrating multiprecision operations using the two extended precision formats shown in FIGS. 2 and 3.

FIG. 21 is a flowchart illustrating multiprecision operations using the two extended precision formats 20, 30 shown in FIGS. 2 and 3. The flowchart starts by converting operands from a packed external format to the first extended precision format 20, step 100. The packed external format utilizes each bit to represent a coefficient of a different power of 2. Thus, a 32-bit word in the packed external format will contain a value from 0 through $2^{32}-1$. A 128-bit number will thus require four 32-bit words for representation, and a 1024-bit number will require 8 128-bit numbers or 32 32-bit numbers. Once the input operands are in the first extended precision format 20, a first operation is performed on the operands in the first extended precision format 20 that generates an intermediate result in the second extended precision format 30, 102. In the examples shown above, two operations shown were multiplication or squaring. Some other operations include: Montgomery modular multiplication; Montgomery modular power; Montgomery modular squaring; multiply-add; and multiply-subtract. As long as there are more operations to perform, step 104, a second operation is performed on the intermediate operand or operands in the second extended precision format 30 to convert them back into operands in the first extended precision format 20, step 106. This can typically be done on large numbers of vector elements simultaneously by shifting, ANDing, and adding as described in FIGS. 11–13. Finally, when there is no more to do, step 104, the result is converted from the second extended format 30 to a packed external format, step 108. The method for doing this was described in FIGS. 14–20. This conversion step is the only place where messy carries need to be rippled. Both the first and second extended precision formats have a designed redundancy which introduces an additional number of bits in order to make a large increase in performance on general purpose register hardware and particularly for SIMD processors.

Figure 22:
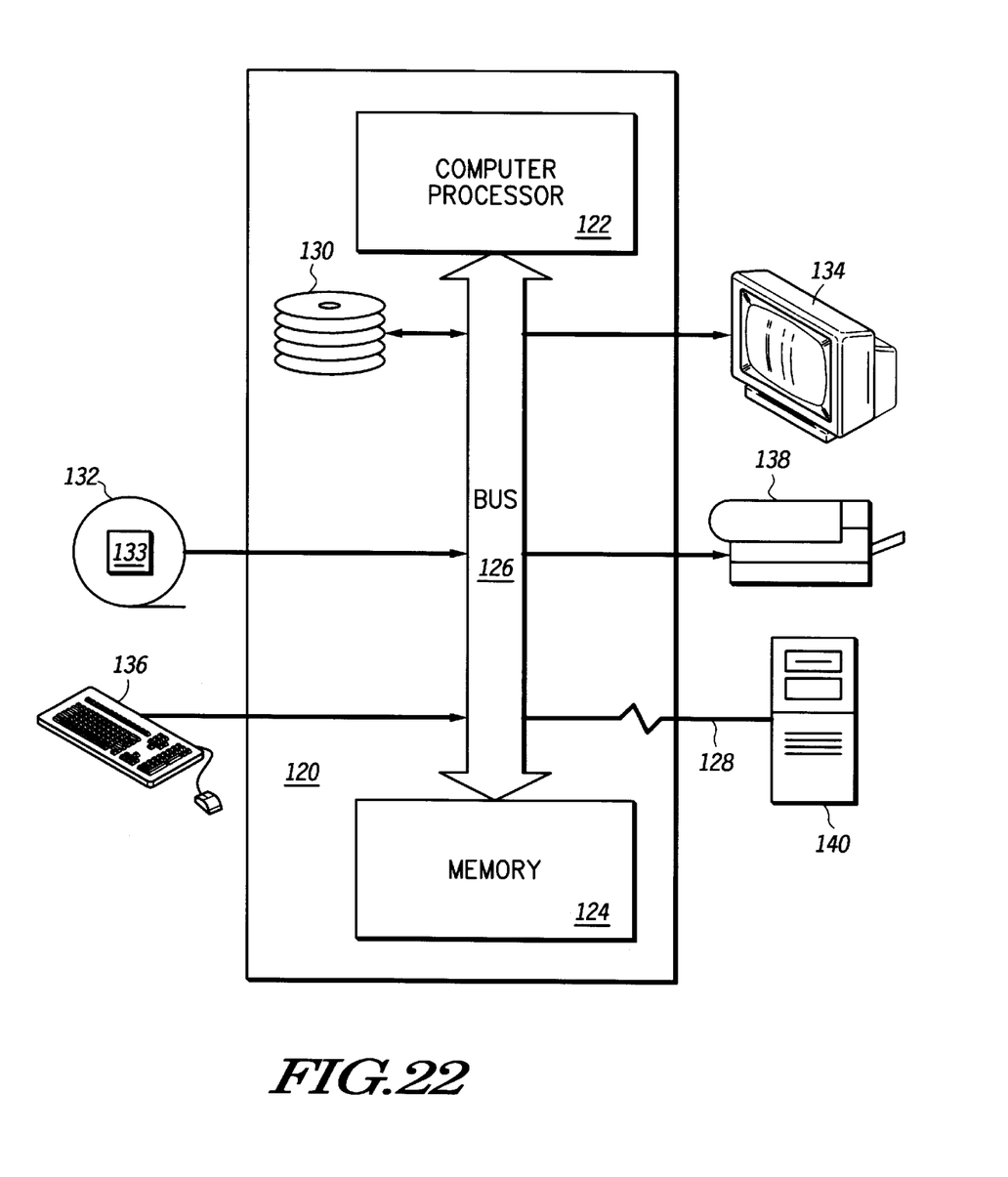
FIG. 22 is a block diagram illustrating a General Purpose Computer on which the extended precision formats shown in FIGS. 2 and 3 can be utilized.

FIG. 22 is a block diagram illustrating a General Purpose Computer 120 on which the extended precision formats shown in FIGS. 2 and 3 can be utilized. The General Purpose Computer 120 has a Computer Processor 122, and Memory 124, connected by a Bus 126. Memory 124 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 130, External Storage 132, output devices such as a monitor 134, input devices such as a keyboard (with mouse) 136, and printers 138. Secondary Storage 130 includes machine readable media such as hard disk drives, magnetic drum, and bubble memory. External Storage 132 includes machine readable media such as floppy disks, removable hard drives, magnetic tape, CD-ROM, and even other computers, possibly connected via a communications line. The adistinction drawn here between Secondary Storage 130 and External Storage 132 is primarily for convenience in describing the invention. As such, it should be appreciated that there is substantial functional overlap between these elements. Computer software such as programs implementing the methods disclosed herein such as utilizing the two different extended precision formats for calculation of encryption key values and user programs can be stored in a Computer Software Storage Medium, such as memory 124, Secondary Storage 130, and External Storage 132. Executable versions of computer software 133, can be read from a Non-Volatile Storage Medium such as External Storage 132, Secondary Storage 130, and Non-Volatile Memory and loaded for execution directly into Volatile Memory, executed directly out of Non-Volatile Memory, or stored on the Secondary Storage 130 prior to loading into Volatile Memory for execution.

While the methods disclosed herein provide for efficient calculation using two data formats for extended precision arithmetic using conventional single-instruction/single-data (SISD) processors as illustrated in FIG. 10, they are especially useful when used SIMD vector processors. One such SIMD processor that supports such vector operations is disclosed in U.S. Pat. No. 5,600,846 to Michael Gallup, et. al., titled "Data Processing System and Method Thereof", assigned to assignee hereof, and incorporated herein by reference.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of computing an extended precision result utilizing extended precision operands in a data processing system, wherein said method comprises:
    A) performing a first operation on a first extended precision number in a first extended precision format as a first operand to generate a second extended precision number in a second extended precision format, wherein:
        the first extended precision format represents a number as a sum of a plurality of w1-bit coefficients multiplied times powers of $2^{b1}$, with w1>b1,
        the second extended precision format represents a number as a sum of a plurality of w2-bit coefficients multiplied times powers of $2^{b2}$, with w2>b2, and
    B) performing a third operation, the third operation either to transform an initial extended precision number in a packed extended precision format into the first extended precision number in the first extended precision format or to transform the second extended precision number in the second extended precision format into a final extended precision number in a packed extended precision format.

2. The method in claim 1 which further comprises:
    B) performing a second operation on the second extended precision number in the second extended precision format to generate a third extended precision number in the first extended precision format; and
    C) repeating step (A) with the third extended precision number as the first operand in step (A).

3. The method in claim 2 which further comprises:
    D) repeating steps (B) and (C) as a loop at least one time with the third extended precision number of a specific loop as the first operand in step (A) in a next loop.

4. The method in claim 3 which further comprises:
    E) performing a third operation to transform an initial extended precision number in a packed extended precision format into the first extended precision number in the first extended precision format.

5. The method in claim 4 which further comprises:
    F) performing a fourth operation to transform the second extended precision number in the second extended precision format into a final extended precision number in a packed extended precision format.

6. The method in claim 1 wherein:
    w2 is equal to 2*w1, and
    b2 is equal to 2*b1.

7. The method in claim 6 wherein:
    b1 is equal to 12, and
    w1 is equal to 16.

8. The method in claim 6 wherein:
    b1 is equal to 24, and
    w1 is equal to 32.

9. The method in claim 1 wherein:
    b2 is equal to 24, and
    w2 is equal to 32.

10. The method in claim 1 wherein:
    the first operation performs a multiplication of the first extended precision number multiplied times a fourth extended precision number in the first extended precision format.

11. The method in claim 1 wherein:
    the first operation squares the first extended precision number.

12. The method in claim 1 wherein:
    the first operation performs a Montgomery modular multiplication of the first extended precision number multiplied times a fourth extended precision number in the first extended precision format.

13. The method in claim 1 wherein:
    the first operation performs a Montgomery modular power of the first extended precision number.

14. The method in claim 13 wherein:
    the Montgomery modular power is a Montgomery modular square of the first extended precision number.

15. The method in claim 1 wherein:
    the first operation performs a multiplication of the first extended precision number multiplied times a fourth extended precision number in the first extended precision format and adds that product to a fifth extended precision number in the second extended precision format.

16. The method in claim 1 wherein:
the first operation performs a square of the first extended precision number and adds that product to a fourth extended precision number in the second extended precision format.

17. The method in claim 1 wherein:
the data processing system is a Single Instruction/Multiple Data (SIMD) system;
in step (A) the first operation includes a partial multiply-accumulate operation to generate an intermediate result that comprises:
multiplying in parallel each element of a first set of w1-bit coefficients in the first extended precision format by an element of a second set of w1-bit coefficients in the first extended precision format to generate a set of intermediate products in the second extended precision format, and
adding in parallel the set of intermediate products to a set of product sums of w2-bit coefficients in the second extended precision format to generate the intermediate result.

18. The method in claim 17 wherein within step (A):
the first set of w1-bit coefficients is a subsequence of a set of w1-bit coefficients of a multiplier, and
the second set of w1-bit coefficients is a repeated subsequence of a set of w1-bit coefficients of a multiplicand.

19. A method of computing an extended precision result utilizing extended precision operands in a data processing system, wherein said method comprises:
A) performing a first operation on a first extended precision number in a first extended precision format as a first operand to generate a second extended precision number in a second extended precision format, wherein:
the first extended precision format represents a number as a sum of a plurality of 16-bit coefficients multiplied times powers of $2^{12}$, and
the second extended precision format represents a number as a sum of a plurality of 32-bit coefficients multiplied times powers of $2^{24}$;
B) performing a second operation on the second extended precision number in the second extended precision format to generate a third extended precision number in the first extended precision format;
C) repeating step (A) with the third extended precision number as the first operand in step (A);
D) repeating steps (B) and (C) as a loop at least one time with the third extended precision number of a specific loop as the first operand in step (A) in a next loop;
E) performing a third operation to transform an initial extended precision number in a packed extended precision format into the first extended precision number in the first extended precision format; and
F) performing a fourth operation to transform the second extended precision number in the second extended precision format into a final extended precision number in a packed extended precision format.

20. A system for computing an extended precision result utilizing extended precision operands in a data processing system, wherein said system comprises:
A) a set of computer readable instructions for a computer processor, the set of computer readable instructions stored in a computer software storage medium for performing a first operation on a first extended precision number in a first extended precision format as a first operand to generate a second extended precision number in a second extended precision format, wherein:
the first extended precision format represents a number as a sum of a plurality of w1-bit coefficients multiplied times powers of $2^{b1}$, with w1>b1,
the first operation to perform a multiplication of the first extended precision number multiplied times a third extended precision number in the first extended precision format, and
the second extended precision format represents a number as a sum of a plurality of w2-bit coefficients multiplied times powers of $2^{b2}$, with w2>b2.

21. A method of computing an extended precision result utilizing extended precision operands in a data processing system, wherein said method comprises:
performing a first operation on a first extended precision number in a first extended precision format as a first operand to generate a second extended precision number in a second extended precision format, wherein:
the first extended precision format represents a number as a sum of a plurality of w1-bit coefficients multiplied times powers of $2^{b1}$, with w1>b1,
the first operation to square the first extended precision number, and
the second extended precision format represents a number as a sum of a plurality of w2-bit coefficients multiplied times powers of $2^{b2}$, with w2>b2.

22. A method of computing an extended precision result utilizing extended precision operands in a data processing system, wherein said method comprises:
performing a first operation on a first extended precision number in a first extended precision format as a first operand to generate a second extended precision number in a second extended precision format, wherein:
the first extended precision format represents a number as a sum of a plurality of w1-bit coefficients multiplied times powers of $2^{b1}$, with w1>b1,
the first operation to perform a multiplication of the first extended precision number multiplied times a third extended precision number in the first extended precision format, and
the second extended precision format represents a number as a sum of a plurality of w2-bit coefficients multiplied times powers of $2^{b2}$, with w2>b2.

23. A method of computing an extended precision result utilizing extended precision operands in a data processing system, wherein said method comprises:
performing a first operation on a first extended precision number in a first extended precision format as a first operand to generate a second extended precision number in a second extended precision format, wherein:
the first extended precision format represents a number as a sum of a plurality of w1-bit coefficients multiplied times powers of $2^{b1}$, with w1>b1,
the first operation to perform a Montgomery modular power of the first extended precision number, and
the second extended precision format represents a number as a sum of a plurality of w2-bit coefficients multiplied times powers of $2^{b2}$, with w2>b2.

* * * * *